UNITED STATES PATENT OFFICE.

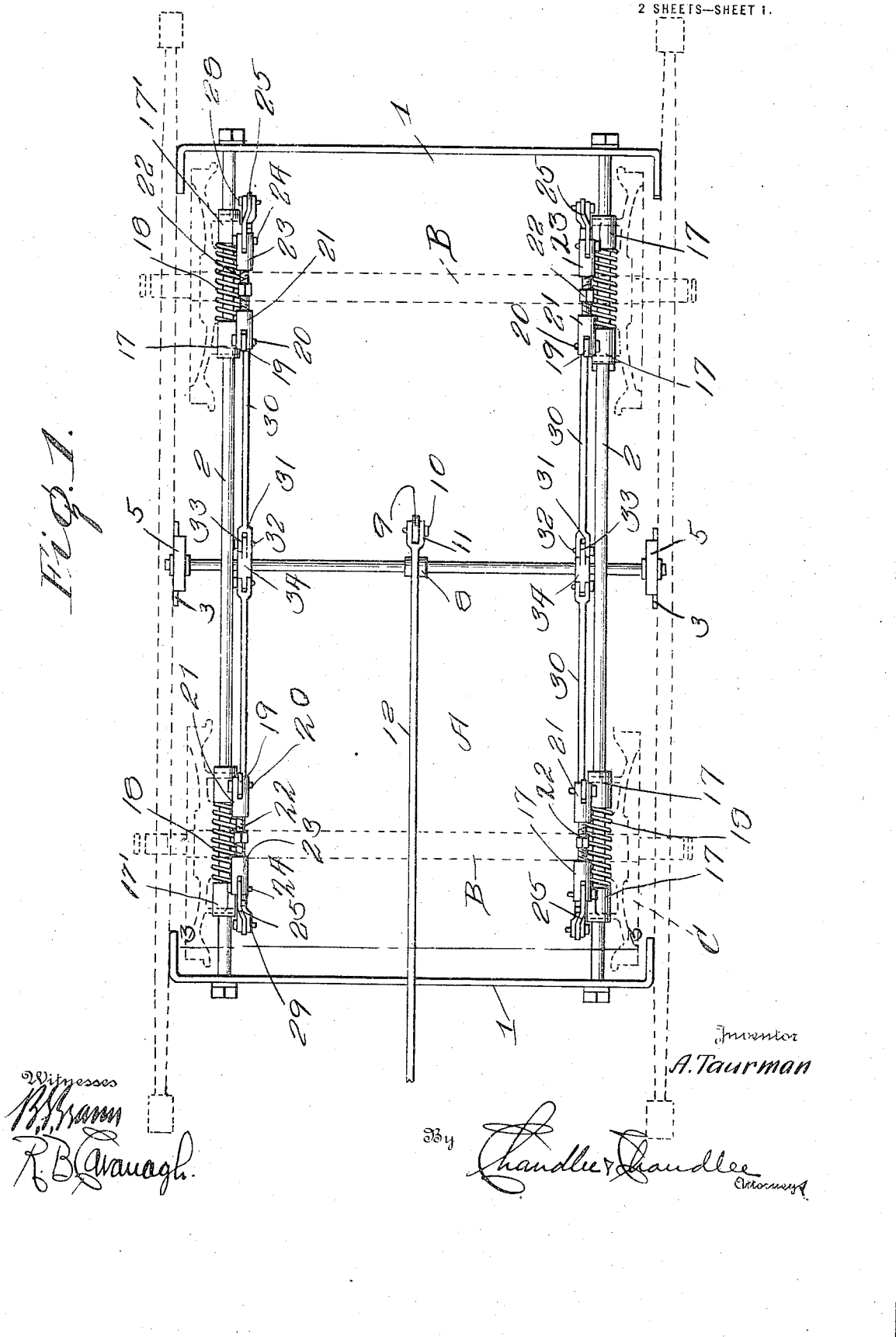

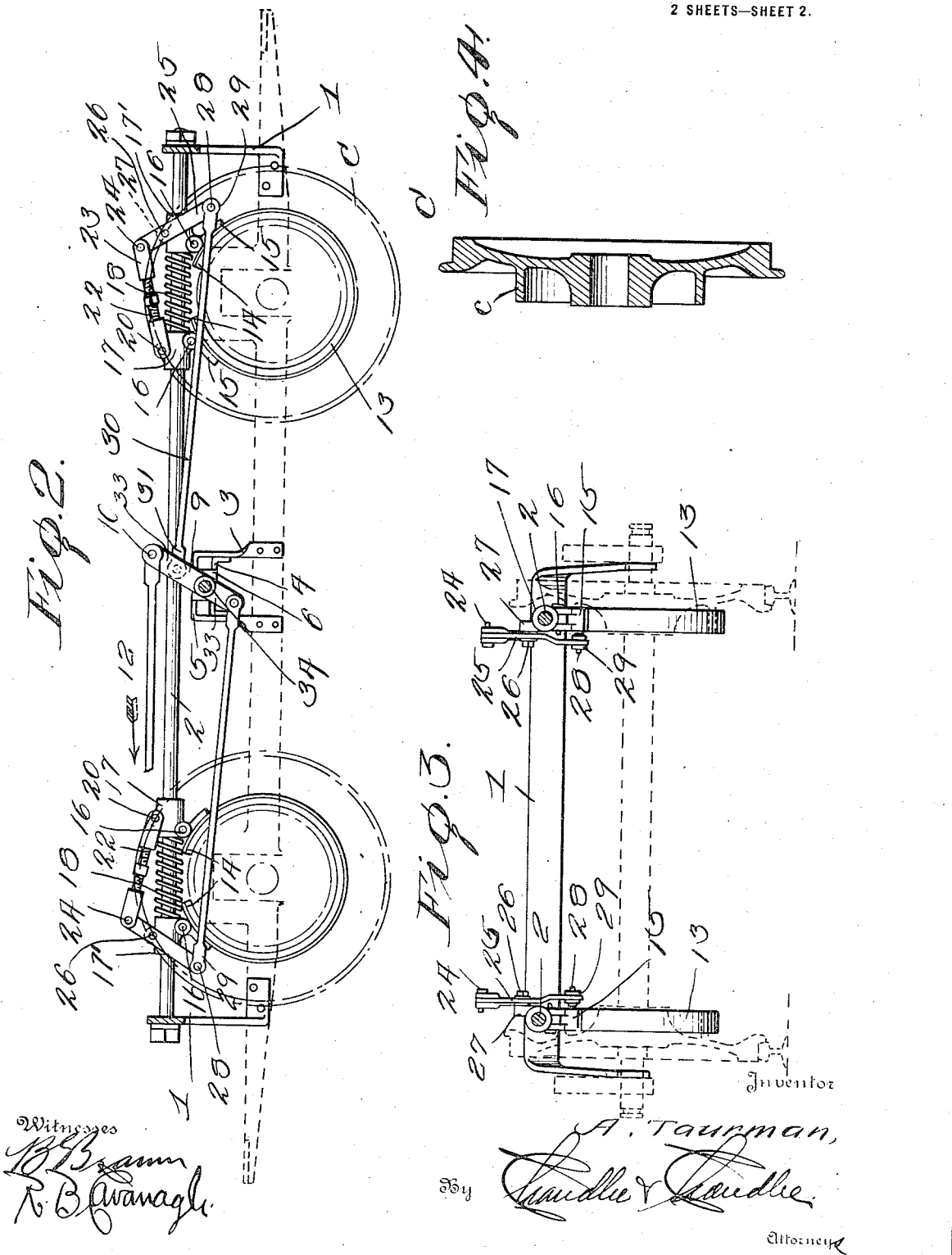

ALPHONSO TAURMAN, OF RICHMOND, VIRGINIA.

RAILWAY BAND-BRAKE.

1,144,922.

Specification of Letters Patent.

Patented June 29, 1915.

Application filed August 21, 1914. Serial No. 357,872.

*To all whom it may concern:*

Be it known that I, ALPHONSO TAURMAN, a citizen of the United States, residing at Richmond, in the county of Henrico, State of Virginia, have invented certain new and useful Improvements in Railway Band-Brakes; and I do hereby declare the following to be a full, clear, and exact description of the invention, such as will enable others skilled in the art to which it appertains to make and use the same.

This invention relates to braking mechanism, and has particular application to certain novel and useful improvements in band brakes adapted especially for use in connection with railway rolling stock.

In carrying out my invention it is my purpose to provide a mechanism of this class which when operated will cause the simultaneous and uniform application of the braking bands to all the traction wheels of the car or vehicle.

A further object of the invention is the provision of means for allowing the automatic shifting or adjustment of each band brake to compensate for any ordinary wear or lost motion in the parts of such individual brake so that the brakes will be applied substantially simultaneously and with substantially uniform pressure to the braking surfaces of wheels.

Another object of the invention is to so construct and arrange the operating or power applying mechanism of the band brakes as to require but a slight effort or movement on the part of the operator to cause the application and release of all the brakes.

It is also my purpose to provide the wheels of the car or vehicle with braking surfaces, independent of the main tread and of smaller diameter than the latter adapted to be engaged by the brake bands when braking pressure is applied, such braking surfaces and brakes being so located and arranged as to enable them to be used in connection with standard car equipment and without changing the ordinary construction of the car trucks and equipment.

I also aim to provide a band braking mechanism which will embody the desired features of simplicity, efficiency and reliability, and which may be manufactured, installed and maintained at a relatively low cost.

With the above recited objects and others of a similar nature in view, my invention consists in the construction, combination and arrangement of parts set forth in and falling within the scope of the appended claims.

In the accompanying drawings: Figure 1 is a top plan view of a band brake mechanism embodying my invention, the car truck and traction wheels being shown in dotted lines. Fig. 2 is a view in side elevation. Fig. 3 is a cross sectional view taken on the line 3—3 of Fig. 1. Fig. 4 is a detail sectional view of one of the traction wheels, and showing the location of the brake surface.

Referring now to the accompanying drawings in detail, the letter A indicates the car truck or frame which is herein shown conventionally, while B indicates the axles and C the traction wheels. In Figs 1, 2 and 3, these parts are shown in dotted lines.

The car truck A is provided with the transverse end bars 1—1 bolted to the side frames, these bars carrying the longitudinal rods 2—2, from which the band brakes are suspended. Intermediate the ends of each of the side frames of the car truck is bolted a yoke bracket 3, of approximately inverted U-shape form, these brackets extending above the side frames. Each bracket has a cross bar 4, extending parallel with but spaced apart from the top bar 5 of the bracket, so that a space or way is provided in which slides a bearing block 6. Extending across the car truck is a rock-shaft 7, the ends of which are carried by the bearing blocks 6, as clearly shown in Figs. 1 and 2. Thus it will be seen that the rock-shaft may have a limited movement bodily lengthwise of the car truck A, this taking place when the blocks 6 slide or shift in the yoke brackets.

To the center of the rock-shaft 7 is fastened a collar 8, carrying the arm 9 to which is pivoted, as at 10, the bifurcated end 11 of the operating lever rod 12, the latter extending longitudinally of the car, and any suitable means, (not shown) under control of the motorman or other operator may be employed in connection with this lever for actuating the same to cause the application and release of the brakes.

As each of the traction wheels and the band brake mechanism therefor is simile in construction, a description one will suffice for all.

Each of the traction wheels C is provided with a braking surface which in the present instance is illustrated as being in the nature of a circular brake flange c projecting from the face thereof, and this flange is of less diameter than the diameter of the tread. This flange may be cast integral with the wheel or bolted, or otherwise attached thereto, as found desirable, and it will be further understood that this braking surface may be applied to either the inner or outer face of the wheel.

Extending around each brake flange c is an adjustable brake band 13, adapted when tightened on the flange to frictionally engage the latter and stop the rotation of the traction wheel, as is readily understood.

Fastened to each band 13, adjacent the spaced ends 14—14 thereof are the lugs 15—15, pivotally connected at 16—16 to the spaced sleeves 17—17′ sliding on the adjacent rod 2, a coil expansion spring 18 surrounding the rod 2, and bearing at its ends against the sleeves 17—17′ and normally tending to push the latter apart, and thus hold the band brake in unset released position. Each sleeve 17 has an ear 19 projecting upward therefrom to which ear is pivoted as at 20 the adjacent bifurcated end 21 of the turn buckle rod 22, the opposite bifurcated end 23 of this turn buckle rod 22 being pivotally connected as at 24 to the lever 25, which in turn is pivoted at 26 to the ear 27 of the sleeve 17′. The lower end of this lever 25 is pivotally connected at 28 to the end 29 of the link rod 30, this rod 30 extending longitudinally of the truck A and having its other end 31 pivoted at 32 to one of the arms 33 carried by the collar 34, which collar is fast on and rocks with the rock-shaft 7. It will, of course, be understood, especially by reference to Figs. 1 and 2, that there are two collars 34 arranged one near each end of the rock-shaft 7, and each collar has a pair of oppositely extending arms 33, so that there are four of these arms 33 in all, one for each link rod 30, there being four of these link rods or one for each band brake.

From the above description taken in connection with the accompanying drawings, the construction and operation of my invention will be readily apparent.

Assuming the braking mechanism to be mounted as shown in Figs. 1 and 2, with the brake bands just clearing or out of contact with the brake flanges c of the wheels C, if it is desired to apply the brakes, the operator moves the operating rod 12 forward or in the direction of the arrow in Fig. 2, thereby moving the arm 9, to an approximately vertical position and rocking the shaft 7 in its bearing blocks. This will rock the collars 34, carrying the arms 33 and pull the link rods 30 toward the center of the truck, thus pulling on the lower ends of the levers 25 and as the latter approach approximately vertical position the upper ends of these levers 25 pull on the turn buckle rod 22 and draw the sleeves 17 toward the sleeves 17′ against the action of the springs 18, thus causing all the brake bands to simultaneously engage all the brake flanges c to stop the car. To release the brakes the operator releases the power from the operating rod 12, and the brakes are released by the action of the springs 18.

Now should it happen that through wear, mal-adjustment or any other reason, there should exist a tendency for one pair of the brake bands to be out of adjustment relative to the other pair of brake bands, this will be corrected because the bearing blocks may shift or slide in their yoke brackets and consequently shift the rock-shaft to such a position as to equalize the pull on both pairs of brakes and cause their substantially uniform application. For instance, should the pair of brake bands at the front of the truck or at the left of Fig. 2 have a tendency to fail to grip its brake flange at the same time as the brake bands at the rear of the truck or at the right hand of the figure, immediately the latter bands have engaged, the continued pull on the rod 12, in the direction of the arrow will cause the blocks 6 and consequently the rock-shaft 7, to move back toward the right a short distance, thus pulling the brakes at the left of the figure to proper braking position. Thus I provide for the automatic compensation of any irregularity such as is liable to occur in the adjustment of the brakes and assure that the pairs of brakes will be uniformly applied.

While I have herein shown and described one particular embodiment of my invention I wish it to be understood that I do not confine myself to all the precise details of construction herein set forth by way of illustration, as modification and variation may be made without departing from the spirit of the invention or exceeding the scope of the appended claims. For instance, in the form of the invention herein illustrated I have shown braking mechanism as employed in connection with and applied to a single truck having four wheels, but it will, of course, be apparent that it may be applied to a double truck vehicle having eight or more wheels, it being only necessary to duplicate the various parts herein shown, all being arranged to substantially operate in unison.

What I claim is:

1. The combination with a vehicle and a pair of traction wheels therefor, of an adjustable double-acting band brake for each wheel, and means for simultaneously and uniformly applying and releasing both the brakes, said means including a rock shaft bodily shiftable relative to the vehicle.

2. In a vehicle, the combination with a truck, of a pair of wheels located at each side of the truck, each wheel having a braking surface, a pair of supports arranged at opposite sides of the truck, a pair of band brakes adjustably mounted on each support, each band brake being adapted to act upon the braking surface of the adjacent wheel, and means for applying and releasing all of the band brakes, said means including a bodily shiftable element, connections between the element and all of the band brakes, and an operating member for actuating the element.

3. In a vehicle, the combination with a truck, of a pair of wheels at each side of the truck, each wheel having a braking surface, a pair of supporting rods carried by the truck and arranged one at each side of the truck, a pair of adjustable band brakes carried by each rod, each band brake being adapted to engage the braking surface of the adjacent wheel, a bodily shiftable rock shaft, connections between the rock shaft and all of the band brakes, and means under control of the operator for actuating the shaft to cause the application of the band brakes to the respective braking surfaces of the wheels.

4. The combination with a vehicle including two pairs of wheels, of two pairs of band brakes for the two pairs of wheels, a sliding sleeve connected to each end portion of each band brake, a spring interposed between the pairs of sleeves of each band brake and adapted to normally throw said band brake out of braking relation with the wheel, a lever pivoted to one of the pair of sleeves of each brake, of a connection between one end of the lever and the opposite sleeve of the brake, a bodily shiftable rock shaft common to all of the brakes, means connecting the rock shaft and the lever of each brake, and means for actuating the rock shaft to cause the application of all of the brakes against the action of the springs of the brakes.

5. The combination with a vehicle including two pairs of wheels, of two pairs of band brakes for the two pairs of wheels, a sliding sleeve connected with each end portion of each band brake, a spring interposed between the two sleeves of each band brake and adapted to normally throw said band brake out of braking relation with the wheel, a lever for each band brake pivoted to one of the sleeves of each band brake, a connection between one end of the lever and the other sleeve of each band brake, a bodily shiftable rock shaft common to all of the brakes, a pivoted connecting rod connecting the rock shaft with the lever of each brake, and means for actuating the rock shaft to cause the application of all of the brakes against the action of the springs of the brakes.

In testimony whereof, I affix my signture, in the presence of two witnesses.

ALPHONSO TAURMAN.

Witnesses:
   Andrew Welsh,
   C. G. Sohn.